(12) United States Patent
Kafle et al.

(10) Patent No.: US 12,728,670 B2
(45) Date of Patent: Sep. 8, 2026

(54) SEAL GUARD FOR COMPACTOR

(71) Applicant: Caterpillar Inc., Peoria, IL (US)

(72) Inventors: Hari Prasad Kafle, Montgomery, IL (US); Steven Todd Haroldson, Trivoli, IL (US); James William Schaffer, Oswego, IL (US); Robert Leo Gosda, Yorkville, IL (US); Daniel Patrick Vertenten, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 742 days.

(21) Appl. No.: 18/122,357

(22) Filed: Mar. 16, 2023

(65) Prior Publication Data

US 2024/0308271 A1 Sep. 19, 2024

(51) Int. Cl.
*B60B 35/16* (2006.01)
*E02D 3/026* (2006.01)

(52) U.S. Cl.
CPC ............ *B60B 35/16* (2013.01); *E02D 3/0265* (2013.01); *B60B 2900/211* (2013.01); *B60B 2900/212* (2013.01); *B60B 2900/323* (2013.01); *B60B 2900/5112* (2013.01)

(58) Field of Classification Search
CPC ............... B60B 35/16; B60B 2900/211; B60B 2900/212; B60B 2900/323; B60B 2900/5112; E02D 3/0265; E02D 3/026; E02D 3/032; E02D 3/039
See application file for complete search history.

(56) References Cited

U.S. PATENT DOCUMENTS

| | | | |
|---|---|---|---|
| 3,913,985 A | 10/1975 | Orr et al. | |
| 5,951,123 A * | 9/1999 | Bomstad | E02D 3/026 172/112 |
| 5,967,242 A | 10/1999 | Caron et al. | |
| 6,231,136 B1 * | 5/2001 | Freeman | B62D 55/088 305/107 |
| 6,293,631 B1 * | 9/2001 | Freeman | B62D 55/088 301/107 |
| 6,322,170 B1 | 11/2001 | Knell et al. | |
| 7,556,323 B1 * | 7/2009 | Gachhadar | B60B 15/025 305/100 |
| 7,731,307 B1 | 6/2010 | Freeman | |
| 8,052,228 B2 * | 11/2011 | Brockway | B60S 1/68 305/100 |
| RE45,491 E | 4/2015 | Freeman | |
| 9,701,351 B2 | 7/2017 | Kaufmann et al. | |
| 11,208,163 B2 | 12/2021 | Freeman | |

(Continued)

FOREIGN PATENT DOCUMENTS

| | | |
|---|---|---|
| IN | 201611028705 A | 3/2018 |
| JP | 6385904 B2 | 9/2018 |

*Primary Examiner* — Abigail A Risic

(57) ABSTRACT

A guard for a seal of a wheeled industrial machine, the guard comprising an cylindrical, annular body having a first plate, a second plate with an upper portion and a lower portion, and a connecting portion extending between the first plate and the second plate; wherein the first plate extends in a radially inward direction from the connecting portion and includes a plurality of holes; wherein the upper portion is configured to extend into a corresponding slot of a rotating element of a wheel of the wheeled industrial machine; and wherein the lower portion is configured to extend toward an axle of the wheeled industrial machine.

16 Claims, 6 Drawing Sheets

(56) References Cited

U.S. PATENT DOCUMENTS 11,506,287 B2 * 11/2022 McCartney .......... F16J 15/3272
2004/0012244 A1 * 1/2004 Waterman ............... E02D 3/026
301/37.101
2012/0067603 A1 3/2012 Springer
2016/0375916 A1 * 12/2016 Zanghelli ................ B61F 15/26
295/37
2020/0166178 A1 * 5/2020 Gerritzen ................ F01D 5/026
2023/0347687 A1 * 11/2023 Gavin ................... B60B 35/163

* cited by examiner

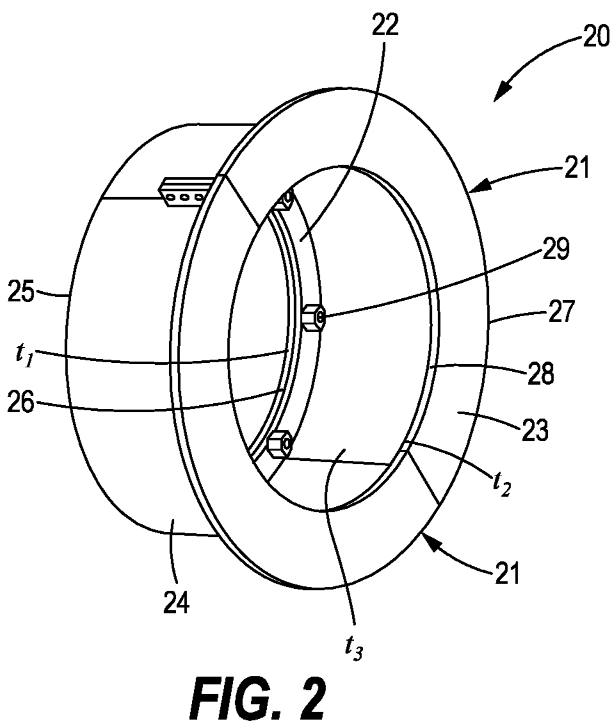
FIG. 2
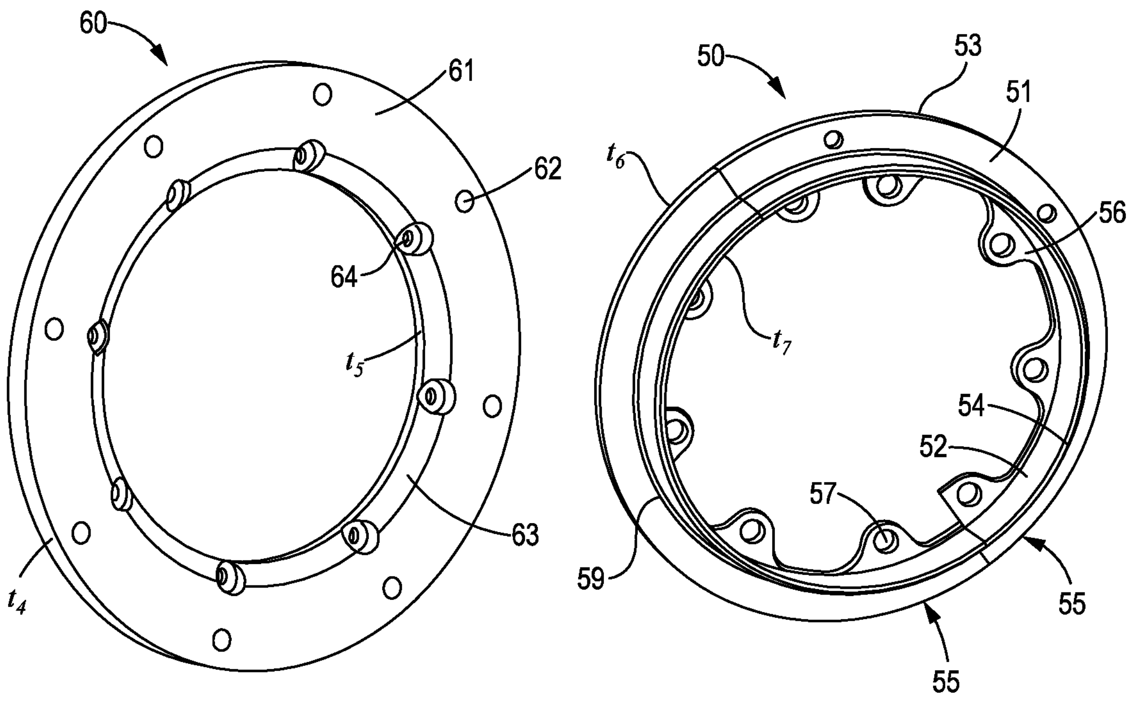
FIG. 3
FIG. 4

SEAL GUARD FOR COMPACTOR

TECHNICAL FIELD

The present disclosure generally relates to heavy equipment and work machines, and more particularly, relates to protection devices and techniques for drivelines of compaction machines operating in harsh conditions such as landfill sites.

BACKGROUND

Compactors in the form of wheeled work machines may be used in the landfill industry to compact refuse for full utilization of the landfill space. Axles may be provided on the compactor, and final drive assemblies may be provided outward of the axle to connect to wheels, and provide motive power in the form of rotation to drive the compactor. To retain lubricant and prevent ingress of debris from moving components, seals may be provided between rotating and non-rotating parts of the axle, the final drive, and other driven components.

Wheels of the compactor may be typically provided with cutting devices, which operate to sever refuse material that the compactor travels over. In so doing, the refuse may be more tightly compacted. When so severed, any openings between driven components and the wheels of the compactor may allow small debris or other foreign materials to wrap around the axle. Over time, this debris may accumulate and develop excess friction, and/or find their way into a seal area and detrimentally affect the seal. Seal destruction may result in expensive repair and machine downtime when the compactor is being repaired.

Other seal guards have been employed in prior compactor driveline assemblies in order to prevent debris from finding their way into a seal area. U.S. Pat. No. 7,731,307 discloses one of these prior seal guarding assemblies, which has a non-rotating annular steel structure having axially separated flanges at each end, the flanges being sized to create narrow gap seals with the final drive. The seal guard may be mounted to an axle housing end of one of the wheels of a compactor, and may be formed such that the structure of the seal guard creates a labyrinth-like structure that fine debris must travel through in order to access the seal area.

In light of this, it can be seen that there has remained a need for a device with an alternative design which allows for a combination of stationary and rotating guards to effectively protect the wheel seals on compactors.

SUMMARY OF THE DISCLOSURE

In accordance with one aspect of the disclosure, a work machine is provided. The work machine may have an axle, and may have a plurality of wheels. Each of the wheels may be mounted on an outboard end of the axle, and each of the wheels may be of a cylindrical form having a cylindrical shell that may extend axially and concentrically about the axle. The work machine may have a plurality of guard assemblies, with each one of the plurality of guard assemblies associated with each of the wheels. Each of the plurality of wheels may be mounted to the axle such that each of the wheels may cover each of the plurality of guard assemblies. Each of the plurality of guard assemblies may further have a final drive mounted between the outboard end of the axle and a wheel, which may further include an annular seal extending over the final drive: may have a rotating element connected to a corresponding one of the plurality of wheels; may have a rotating guard connected to the final drive; and may have an internal guard fixed to the axle.

In accordance with another aspect of the present disclosure, a method of operating a work machine is provided. The method may comprise providing a work machine having a final drive rotatably supported on an outboard end of an axle, with a wheel mounted to an outboard end of the final drive, the wheel having a cylindrical shell extending axially and concentrically about the axle. The method may further provide for, in normal operation of the machine, allowing foreign material to enter an interior of the cylindrical shell of the wheel, and may further restrict the foreign material to pass through a first gap between the axle and a rotating element connected to the wheel. The method may further comprise bounding the foreign material within a first space defined by the axle, the rotating element, and an internal guard fixed to the axle. The method may further comprise restricting the foreign material to pass through a second gap between the rotating element and the internal guard, the second gap being accessible by the foreign material when a first volume of other foreign material has built up within the first space: may further comprise restricting the foreign material to pass through a third gap between the internal guard and a rotating guard: and may further comprise bounding the foreign material within a second space defined by the internal guard and the rotating guard. The method may further comprise restricting the foreign material to pass through a fourth gap between the internal guard and the rotating guard: the third gap being accessible by the foreign material when a second volume of other foreign material has built up within the second space: and bounding the foreign material within a third space defined by the rotating guard, the internal guard, the axle, and the final drive. The method may also comprise restricting the foreign material to pass through a passage formed between the rotating element and the rotating guard, the passage being accessible by the foreign material as an alternate routing to the third gap: may also comprise restricting the foreign material to pass through a fifth gap between the rotating element and a rotating guard: and may also comprise permitting the foreign material to access a seal area contacting an annular seal extending over the final drive.

In accordance with yet another aspect of the present disclosure, a guard for a seal of a wheeled industrial machine is provided. The guard may comprise an annular body having a first plate, may comprise a second plate having an upper portion and a lower portion, and may comprise a connecting portion extending between the first plate and the second plate. The guard may further comprise wherein the first plate includes a plurality of holes, may further comprise wherein the upper portion is configured to extend into a corresponding slot of a rotating element of a wheel of the wheeled industrial machine, and may further comprise wherein the lower portion is configured to extend toward an axle of the wheeled industrial machine.

These and other aspects and features of the present disclosure will be more readily understood when read in conjunction with the accompanying drawings.

BRIEF DESCRIPTION OF THE DRAWINGS

FIG. 2 is a perspective view of an axle seal guard of the invention, which may be used at each of the four wheels of the compactor of FIG. 1, constructed in accordance with the present disclosure.

FIG. 3 is a perspective view of an intermediate mounting plate for mounting the seal guard of FIG. 2 onto a final drive of each of the four wheels of the compactor of FIG. 1, constructed in accordance with the present disclosure.

FIG. 4 is a perspective view of a fixed internal guard of the invention used at each of the four wheels of the compactor of FIG. 1, constructed in accordance with the present disclosure.

DETAILED DESCRIPTION

Figure 1:
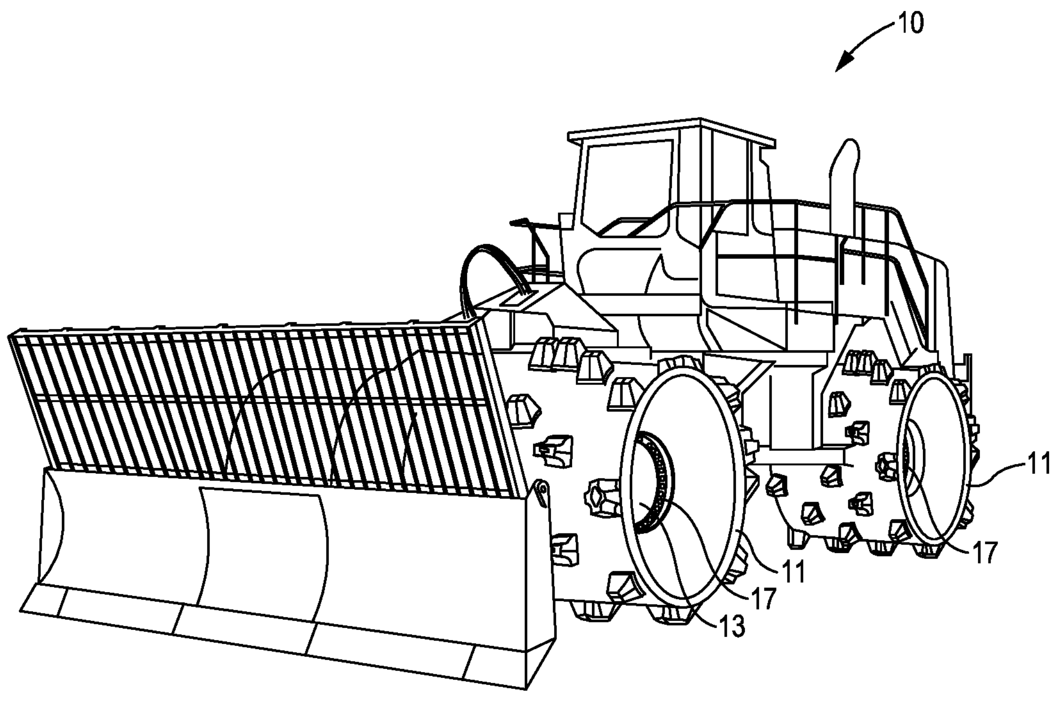
FIG. 1 is a perspective view of a work machine used for compacting refuse material in a landfill, constructed in accordance with the present disclosure.

Referring now to the drawings, and with specific reference to FIG. 1, a work machine constructed in accordance with the teachings of the present disclosure is generally referred to by reference number 10. While the work machine 10 is depicted as a landfill compactor in the exemplary embodiment, it is to be understood that the teachings of this disclosure can be employed with equal efficiency in association with many other wheeled work machines, including but not limited to tractors, motor vehicles, articulated trucks, skid steer loaders, and the like.

Compactors are relatively heavy machines, fitted with steel wheels, that are driven back and forth over refuse dumped in a landfill. Compaction of the debris allows more refuse to be received in a given volume of landfill space. The compactor 10 is schematically shown in FIG. 1. The compactor 10, may have a pair of axle assemblies 12 with each of the axle assemblies 12 including a pair of axle shafts 35 terminating in a wheel 11 on each side of the axle assembly 12 so that the compactor 10 has four wheels 11. Large equipment such as those manufactured by Caterpillar R, models 826K and 836K, are examples of such compactors 10. As such, each side of an axle assembly 12 has a final drive 13 on its outboard end to which a respective wheel 11 is removably connected via bolts 17. Rotation of a wheel 11 requires relative rotation between a non-rotating spindle 18 and a final drive housing 19, both of which are elements of final drive 13. This relative rotation is accommodated by a duo-cone seal 15 that excludes dirt from entering the axle housing 14 and retains lubricant within the axle housing and final drive 13. The duo-cone seal 15, axle assembly 12, final drive 13, and wheel 11, are all common or coaxial.

FIG. 2 illustrates detail of a rotating guard 20 arranged to protect the duo-cone seal 15 associated with the final drive 13 of each of the four wheels 11 on a compactor 10. The rotating guard 20 may be made from steel plate or steel castings and may be an annular structure formed by a plurality of sections 21. In a primary embodiment, the rotating guard 20 may be formed by two generally circular half sections 21, however, the seal guard may also be formed by more than two sections, or may be formed as a single unitary guard.

The rotating guard 20 may be formed by a first plate 22, a second plate 23, and a connecting portion 24 which joins the first plate 22 with the second plate 23. The first plate 22 may be an annular plate having a thickness $t_1$, and may extend from a first plate outer diameter 25 to a first plate inner diameter 26. Equivalently, the second plate 23 may also be an annular plate having a thickness $t_2$ and extending from a second plate outer diameter 27 to a second plate inner diameter 28. It will be understood that the connecting portion 24 may be cylindrically formed having a thickness $t_3$ equivalent or similar to the thickness $t_1$ of the first plate 22 and the thickness $t_2$ of the second plate 23, and may have an outer diameter equivalent to the first plate outer diameter 25, and between the second plate outer diameter 27 and the second plate inner diameter 28. The first plate 22 of the rotating guard 20 may also include holes 29 for allowing the rotating guard 20 to be mounted to final drive 13 by bolts, or any other suitable fastener. As shown in FIG. 2, the rotating guard 20 may be formed into a plurality of sections 21 such as halves in order to facilitate ease of installation onto the axle assembly, and may include flanges 30 on each of the sections 21. The flanges 30 may have holes 31 such that any suitable fastener (not shown) may be employed to connect the sections 21.

FIG. 3 illustrates detail of a rotating guard mount 60 for mounting the rotating guard 20 onto the final drive 13. The rotating guard mount 60 may be formed as an annular disc-like plate 61 which may have a thickness $t_4$, and may be formed as a unitary plate made from steel or similar material. The rotating guard mount 60 may include a first set of holes 62 to correspond with the holes 29 of the rotating guard 20 such that fasteners may be placed through the holes 62 and 29 to connect the rotating guard 20 with the rotating guard mount 60. In the primary embodiment, the fasteners are bolts and nuts, however, any other suitable fasteners may be utilized. The rotating guard mount 60 may include a tapered portion 63 such that the thickness of the plate 61 at an inner diameter, $t_5$, is less than the thickness at an outer diameter, $t_4$. The rotating guard mount 60 may also include a second set of holes 64 to correspond with holes on the final drive 13 to connect the rotating guard mount 60 with the final drive 13 via fasteners.

FIG. 4 illustrates detail of a fixed internal guard 50 arranged to protect the duo-cone seal 15 of the final drive 13 of each of the four wheels 11 on the compactor 10. The fixed internal guard 50 may work in conjunction with the rotating guard 20 in creating a labyrinth-like set of passages that foreign material must travel though in order to reach the duo-cone seal 15. The fixed internal guard 50 may be formed from a mounting plate 51 having a thickness $t_6$ and extending in a radially outward direction terminating at a mounting plate outward end 53, and a perpendicular plate 52 having a thickness $t_7$, which may be an annularly formed plate extending from the mounting plate 51 in an axial direction terminating in a perpendicular plate end 54. Similar to the rotating guard 20, the fixed internal guard 50 may also be formed in a plurality of sections 55, or may be formed as a unitary guard.

In order to be mounted to the axle housing 14, the fixed internal guard 50 may be provided with a plurality of protrusions 56 with a plurality of holes 57, corresponding with matching holes in the axle housing 14. A plurality of fasteners 58 (not pictured) may be placed through holes 57 and into the corresponding holes of the axle housing 14 in order to mount the fixed internal guard 50 to the axle housing 14. In the primary embodiment, the fixed internal guard 50, like the rotating guard 20, is formed by a plurality of steel plates joined by welding, and FIG. 4 shows the fixed internal guard 50 with a weld bead 59, however, fixed internal guard 50 may also be formed from steel castings not requiring the weld bead 59.

Figure 5:
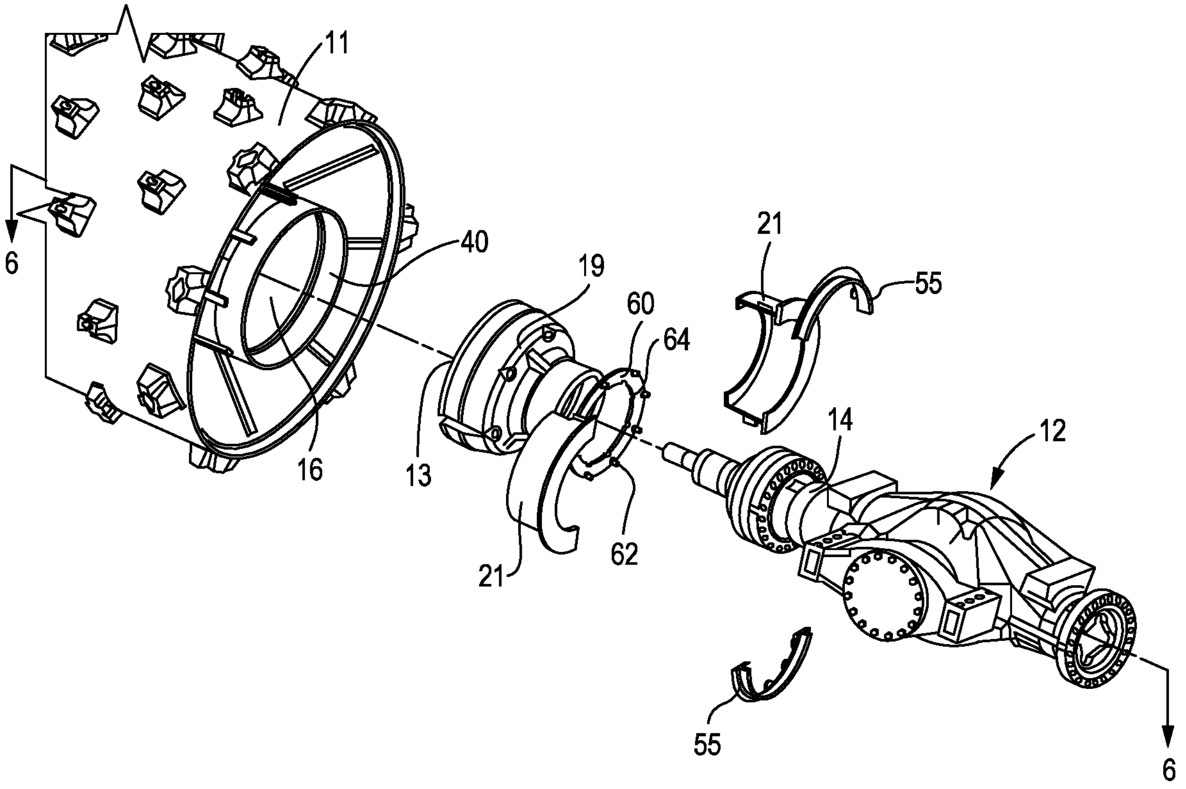
FIG. 5 is an exploded perspective view of the driveline components of a compactor of FIG. 1, constructed in accordance with the present disclosure.
Figure 6:
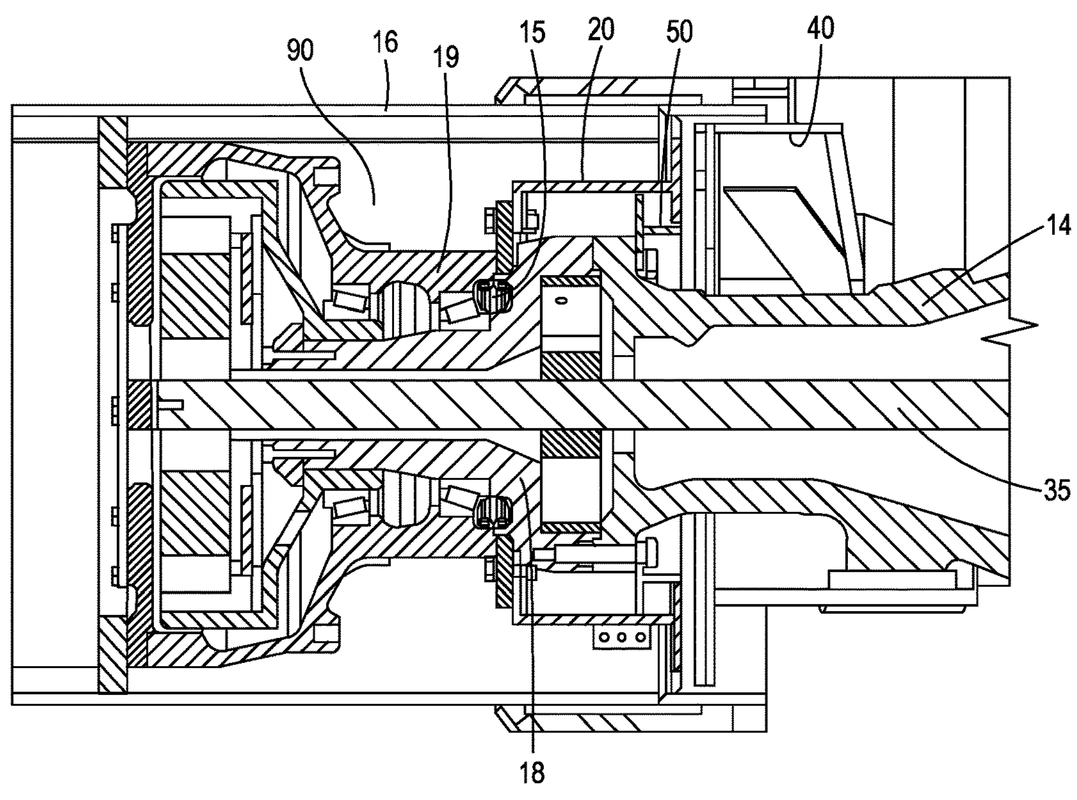
FIG. 6 is a cross-sectional view of a novel seal guard assembly taken along line 6-6 of FIG. 5 and constructed in accordance with the present disclosure.
Figure 7:
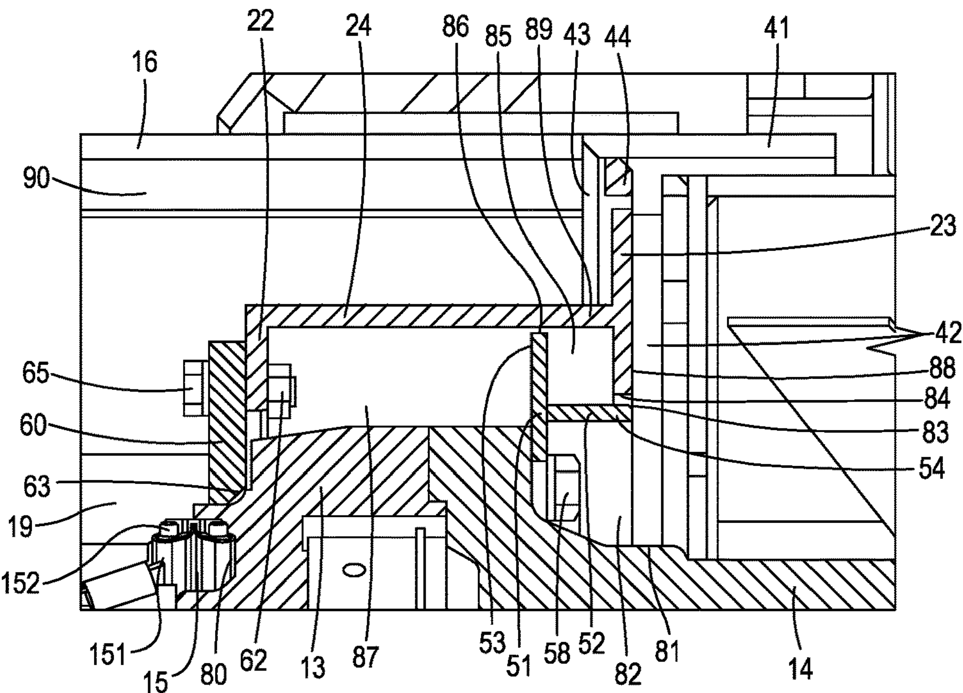
FIG. 7 is an enlarged cross-sectional view of FIG. 6, showing the guard system in greater detail, constructed in accordance with the present disclosure.

FIGS. 5-7 illustrates a solution of the disclosed invention for preventing foreign material from entering the interior of a barrel of a compactor wheel and damaging a duo-cone seal. In the seal guard assembly of the disclosed invention, a wheel drum extension 40, is mounted to a wheel drum 16 of the wheel 11, and rotates with the wheel 11. The final drive 13 may include a non-rotating spindle 18 which is mounted to the axle housing 14, and a rotating assembly including a final drive housing 19. In order to restrict debris from entering the spaces between the rotating and non-rotating components of the final drive 13, a duo-cone seal 15 may be disposed between the spindle 18 and the final drive housing 19. The duo-cone seal 15 may include a seal body 151 and a pair of o-rings 152.

The rotating guard mount 60 may be mounted to an inboard end of the final drive housing 19 of the final drive 13 via fasteners extending through holes 64, may be mounted with a weld, may be mounted with a press fit connection, or the like. The seal guard sections 21 may be joined together and mounted on to the rotating guard mount 60 via fasteners extending through holes 29 and 62. In the primary embodiment as shown in FIGS. 6 and 7, the fasteners are bolts 65 and nuts 66.

As detailed in FIG. 7, the wheel drum extension 40 may have an annular cylindrical portion 41, a first protrusion 42, and a second protrusion 43. The first protrusion 42 and the second protrusion 43 may form annular plates extending in a radially inward direction, and may be spaced apart such that a slot may form between them. The wheel drum extension 40 may also include a deflection ring 44 in the slot between the first protrusion 42 and the second protrusion 43. The second plate 23 of the rotating guard 20 may occupy the slot formed between the first protrusion 42 and the second protrusion 43. The second plate 23 and the second plate outer diameter 27 may be dimensioned such that a slight gap forming a passage 88 may be formed around the second plate 23 as it occupies the slot between the first protrusion 42 and the second protrusion 43. Gapping the second plate 23 of the rotating guard 20 within the wheel drum extension 40 may allow for the rotating guard 20 and the wheel drum extension 40 to rotate together, or in a similar manner, without a physical connection. Furthermore, the first protrusion 42 of the wheel drum extension 40 may be dimensioned to form a first gap 81 between the first protrusion 42 and the axle housing 14. The second protrusion 43 may be similarly dimensioned to form a fifth gap 89 between the second protrusion 43 and the connecting portion 24 of the rotating guard 20.

The fixed internal guard 50 may be mounted to axle housing 14 with fasteners 58. The mounting plate outward end 53 may extend from the axle housing 14 in a radially outward direction toward the connecting portion 24 of the rotating guard 20. The perpendicular plate 52, may extend from the mounting plate 51 in an axial direction towards the first protrusion 42 of the wheel drum extension 40, and may terminate in the perpendicular plate end 54. A second gap 83 may be formed between the perpendicular plate end 54 and the first protrusion 42 of the wheel drum extension 40. The second plate 23 of the rotating guard 20 may extend in a radially inward direction toward the perpendicular plate 52. However, since the fixed internal guard 50 is a non-rotating element, the second plate inner diameter 28 may be dimensioned in order to form a third gap 84 between the second plate 23 and the perpendicular plate 52 of the fixed internal guard 50 in order to facilitate free movement of the rotating guard 20 in relation to the fixed internal guard 50. Furthermore, the mounting plate outward end 53 may be similarly dimensioned in order to form a fourth gap 86 between the mounting plate 51 and the connecting portion 24 of the rotating guard 20.

In order for foreign material to penetrate the seal guard assembly of the disclosed invention and access the seal area 80, foreign material may enter an interior space of wheel drum 16, and may first access a first space 82 from the first gap 81. The first space 82 may be an annular space having a boundary formed by the axle housing 14, the final drive 13, the mounting plate 51 and the perpendicular plate 52 of the fixed internal guard 50, and the first protrusion 42 of wheel drum extension 40. The first space 82 may allow foreign material to build up, thus trapping foreign material in a confined space and preventing foreign material from accessing the seal area 80. Once excess foreign material has built up, the foreign material may then breach the second gap 83, and the foreign material may be diverted between two routes.

In a first routing, the foreign material may breach a third gap 84 in order to reach a second space 85. The second space 85 may also be an annular space, and may be bound by the mounting plate 51 and the perpendicular plate 52 of the fixed internal guard 50, and the connecting portion 24 and the second plate 23 of the rotating guard 20. The second space 85 may allow foreign material to build up once again, and thus may provide a secondary trap for preventing foreign material from reaching the seal area 80. Once excess foreign material has built up in the second space 85, the foreign material may then breach the fourth gap 86 in order to reach a third space 87. The third space 87 may also be an annular space, and may be bound by the spindle 18, the axle housing 14, the perpendicular plate 52 of the fixed internal guard 50, and the connecting portion 24 and the first plate 22 of the rotating guard 20. The third space 87 may allow foreign material to build up once again, and thus may provide a tertiary trap for preventing foreign material from reaching the seal area 80. Only once a sufficient amount of foreign material has built up within the third space 87, the foreign material may travel between gaps between the spindle 18, rotating guard mount 60, and the final drive housing 19 to access the seal area 80 to interact with duo-cone seal 15.

In the second, alternate routing, foreign material may bypass the third gap 84, and travel through a passage 88 formed by the gaps between the second plate 23 and the first protrusion 42, the second plate outer diameter 27 and the deflection ring 44, and the second plate 23 and the second protrusion 43. Foreign material may then breach a fifth gap 89 in order to finally access the excess area 90. The excess area 90 may be bound by wheel drum 16 and the final drive housing 19 such that access to the seal area 80 is further prevented. The volumes of the first space 82, the second space 85, the third space 87, and excess area 90 are relatively large, providing the capacity to trap a considerable volume of foreign material between service intervals and preventing wear on duo-cone seal 15.

In an embodiment of the sealing assembly as shown in FIGS. 6 and 7, lubricant is provided between non-rotating portions of the final drive 13 and the duo-cone seal 15. The tapered portion 63 of the rotating guard mount 60 provides a gap for lubricant to fill in order to facilitate rotation of rotating elements of the sealing assembly in relation to non-rotating elements of the sealing assembly. The passage formed by the tapered portion 63 may extend into the third space 87 such that excess lubricant can mix with foreign material in third space 87, further trapping the foreign material within third space 87.

Figure 8:
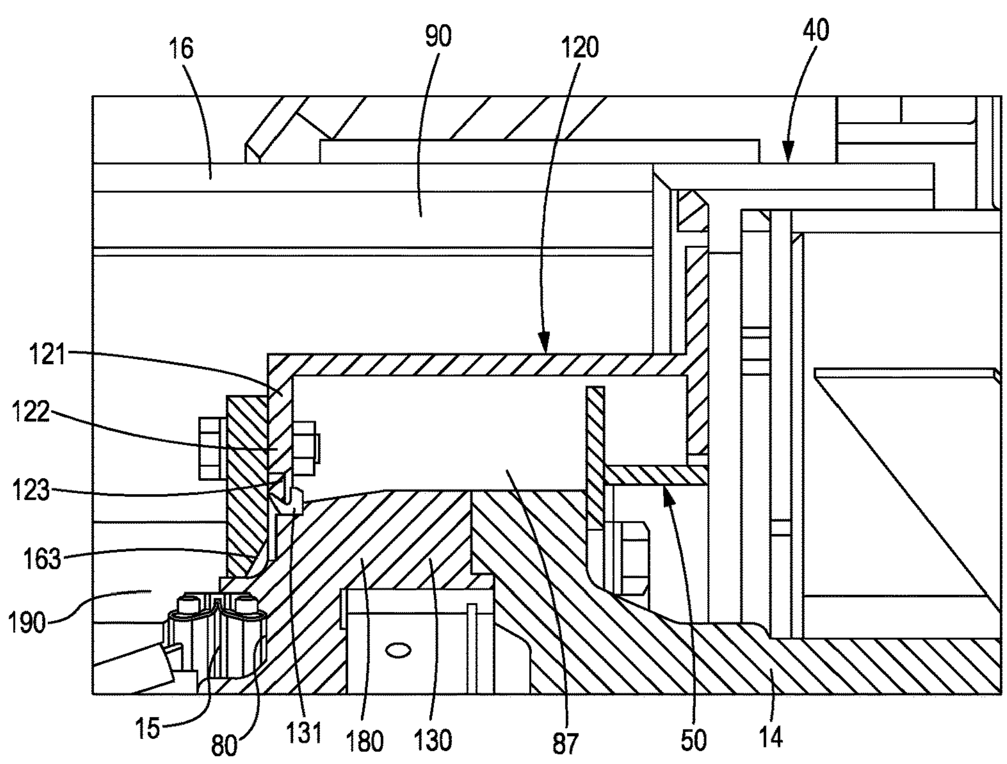
FIG. 8 is an enlarged cross-sectional view of a second embodiment of a novel seal guard assembly in its relation to the final drive, constructed in accordance with the present disclosure.

FIG. 8 illustrates an alternate embodiment of the rotating guard 20 of the disclosed invention, where a further sealing element is provided on the rotating guard 20 in order to further prevent foreign material from accessing gaps between the spindle 18, rotating guard mount 60, and the final drive housing 19 leading to the seal area 80. In the alternate embodiment, an alternate seal guard 120 may be provided. The seal guard 120 may be similar to the rotating guard 20 of the primary embodiment, however, the seal guard 120 may be provided with a lip seal 123 at a radially inner end 122 of a first plate 121 of the seal guard 120. In the alternate embodiment, the lip seal 123 may be formed as a v-shaped seal. The lip seal 123 may be configured to mate with a lip seal area 131, on a spindle 180 of a final drive 130 of the alternate embodiment. The lip seal area 131 may be formed into the spindle 180, and may also be formed as an annular ring pressed onto the spindle 180. The annular ring of the lip seal area may also be attached via an interference fit, a clearance fit, or any other suitable means. Foreign material is thereby prevented from accessing a passage 163 and thereby prevented from escaping the third space 87 into the seal area 80.

Figure 9:
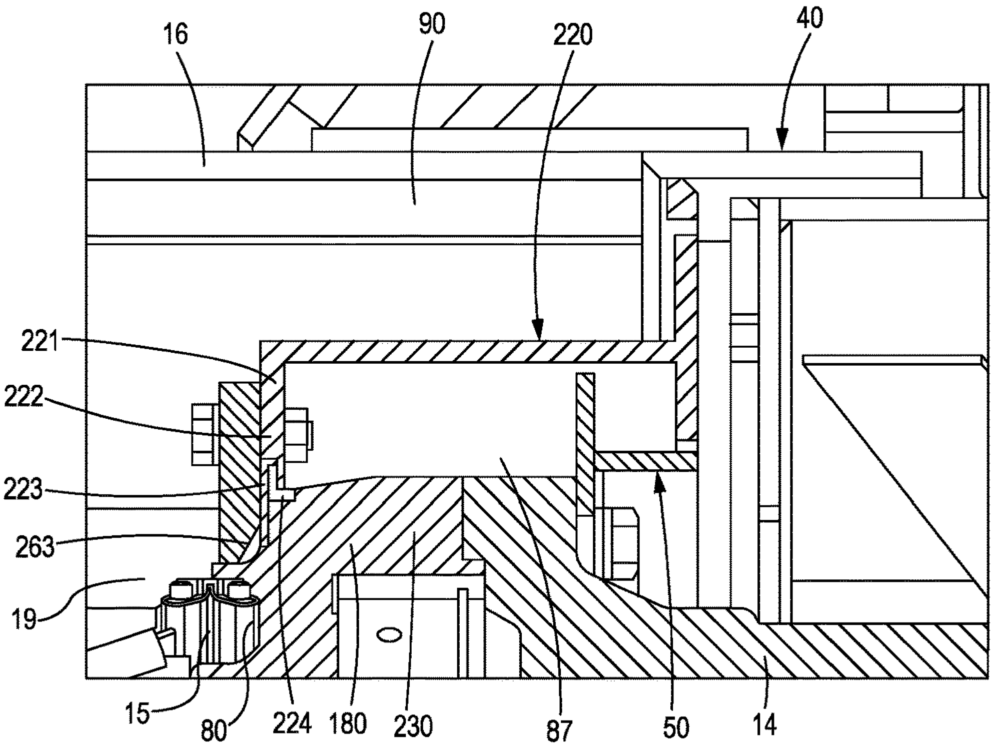
FIG. 9 is an enlarged cross-sectional view of a third embodiment of a novel seal guard assembly in its relation to the final drive, constructed in accordance with the present disclosure.

FIG. 9 illustrates another alternate embodiment of the rotating guard 20 of the disclosed invention, again where a further sealing element is provided on the rotating guard 20 in order to further prevent foreign material from accessing gaps between the spindle 18, rotating guard mount 60, and the final drive housing 19 leading to the seal area 80. In this second alternate embodiment another alternate seal guard 220 may be provided. The seal guard 220 may be similar to the rotating guard 20 of the primary embodiment and the seal guard 120 of the first alternate embodiment. However, the seal guard 220 may be provided with an alternate lip seal 223 at a radially inner end 222 of a first plate 221 of the seal guard 220. In this alternate embodiment, the lip seal 223 may form a C-shape having a channel. A press ring 224 may be configured to mate with the channel of the lip seal 223, and may provide for the lip seal 223 to be held in place when pressed on to a final drive 230 of the alternate embodiment. Foreign material is thereby prevented from accessing a passage 263 and thereby prevented from escaping the third space 87 into the seal area 80.

INDUSTRIAL APPLICABILITY

In operation, the teachings of the present disclosure can find applicability in many instances including but not limited to work machines such as trash compactor vehicles.

Figure 10:
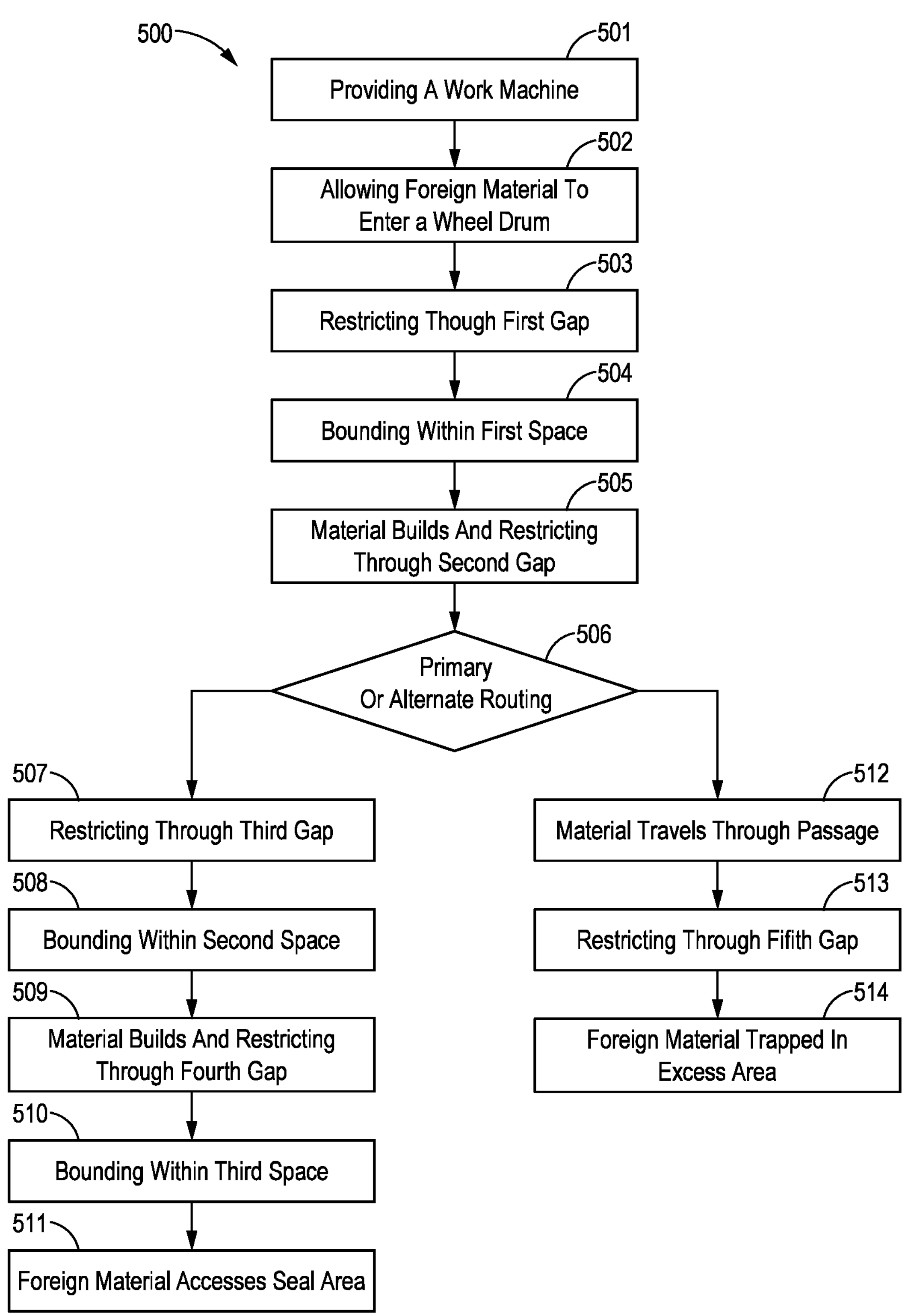
FIG. 10 is a flowchart depicting a sample sequence of steps which may be practiced in accordance with a method of operating a work machine of the present disclosure.

FIG. 10 illustrates a visual representation of a method of operating the work machine 10 such that foreign material may be trapped by a seal guard assembly. In a first step 501, the work machine 10 having the final drive 13 rotatably supported on an outboard end of the axle housing 14, and the wheel 11 mounted to an outboard end of the final drive 13 may be provided. In accordance with the work machine 10 of one embodiment, the wheel 11 may be cylindrical with a wheel drum 16 extending axially and concentrically about the axle assembly 12, the axle housing 14, and the final drive 13.

In a second step 502, the work machine 10 may allow a foreign material to enter the wheel drum 16 of the wheel 11.

In a third step 503, the work machine 10 may restrict the foreign material from accessing the seal area 80 by forcing the foreign material to pass through the first gap 81 between the axle housing 14 and the wheel drum extension 40 connected to the wheel 11.

In a fourth step 504, the work machine 10 may bound the foreign material that has passed through the first gap 81 within the first space 82 defined by the axle housing 14, the wheel drum extension 40, and the fixed internal guard 50 connected to the axle housing 14.

In a fifth step 505, the work machine 10 may restrict the foreign material further, by forcing the foreign material to pass through the second gap 83 between the wheel drum extension 40 and the fixed internal guard 50, the second gap 83 being accessible by the foreign material when a first volume of other foreign material has built up within the first space 82.

In a sixth step, 506, the work machine 10 may further permit the foreign material to pass through a primary routing to access the seal area 80, or an alternate routing.

In a seventh step 507, and the first step of the primary routing, the work machine 10 may further restrict the foreign material to pass through the third gap 84 between the fixed internal guard 50 and the rotating guard 20.

In an eighth step 508, and the second step of the primary routing, the work machine 10 may bound the foreign material within the second space 85 defined by the fixed internal guard 50 and the rotating guard 20.

In a ninth step 509, and the third step of the primary routing, the work machine 10 may further restrict the foreign material to pass through the fourth gap 86 between the fixed internal guard 50 and the rotating guard 20, the fourth gap 86 being accessible by the foreign material when a second volume of other foreign material has built up within the second space 85.

In a tenth step 510, and the fourth step of the primary routing, the work machine 10 may further bound the foreign material within the third space 87 defined by the rotating guard 20, the fixed internal guard 50, the axle housing 14, and the spindle 18.

In an eleventh step 511, and the final step of the primary routing, the work machine 10 may permit the foreign material to access the seal area 80 contacting the duo-cone seal 15.

In a twelfth step 512, and the first step of the alternate routing, the work machine 10 may further restrict the foreign material to pass through the passage 88 formed between the wheel drum extension 40 and the rotating guard 20, the passage 88 being accessible by the foreign material as an alternate routing to the third gap 84.

In a thirteenth step 513, and the second step of the alternate routing, the work machine 10 may further restrict the foreign material by forcing the foreign material to pass through the fifth gap 89 between the wheel drum extension 40 and the rotating guard 20.

Finally, in a fourteenth step 514, and the final step of the alternate routing, the work machine 10 may permit the foreign material from accessing the excess area 90.

The method of operating the work machine 10 describes the apparatus of the primary embodiment and how in operation, the seal guard assembly may provide a labyrinth-like passage structure of increasing complexity that any foreign material or debris must pass through in order to access a seal area of a duo-cone seal. By increasing complexity of the passage as debris moves further and further through the structure, increasingly finer debris may be allowed to access the seal area. As such, the structure of the primary embodiment may allow for a negligible amount of foreign material or debris to fully pass through the full passage and access the seal area.

The rotating seal guard may be easy to implement and may not wear on the axle and thus, may prevent high-cost failure. Moreover, the seal guard may restrict large chunks of foreign material from entering in a wheel area, which may prevent the wheel from wearing. The seal guard may prevent small particles and chunks from accessing a seal area, thereby preventing wear on an exterior of a duo-cone seal and extending service life of the duo-cone seal and the lubricated components of the axle and final drive assemblies.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A work machine, comprising:

an axle;

a plurality of wheels, each of the plurality of wheels mounted on an outboard end of the axle, and having a cylindrical shell extending axially and concentrically about the axle; and a plurality of guard assemblies, each of the plurality of guard assemblies mounted on an outboard end of the axle, and each of the plurality of wheels mounted to the axle such that each of the plurality of wheels covers a respective one of the plurality of guard assemblies, each of the plurality of guard assemblies having:

a final drive rotatably supported on an outboard end of the axle and including an annular seal extending between rotating and non-rotating components of the final drive;

a rotating element connected to a corresponding one of the plurality of wheels;

a rotating guard connected to the final drive; and a fixed internal guard fixed to the axle, wherein the rotating guard comprises a connecting portion and a plate extending from the connecting portion in a radially inward direction toward a portion of the fixed internal guard, and wherein the fixed internal guard extends from the axle in a radially outward direction toward the connecting portion.

2. The work machine of claim 1, wherein the rotating element further comprises a first protrusion extending radially inward, and a second protrusion extending radially inward, the first protrusion and the second protrusion spaced apart to form a slot.

3. The work machine of claim 1, wherein the rotating guard further comprises a first plate, wherein the plate is a second plate having an upper portion and a lower portion, and wherein the connecting portion extends between the first plate and the second plate.

4. The work machine of claim 1, wherein the fixed internal guard comprises:

a mounting plate extending toward the connecting portion, and a perpendicular plate extending toward the rotating element.

5. The work machine of claim 4, further comprising a first space formed by the mounting plate, the perpendicular plate, and the axle, the first space trapping material that enters the cylindrical shell of one of the plurality of wheels.

6. The work machine of claim 5, further comprising a second space formed by the fixed internal guard and the rotating guard, the second space trapping an excess of material that has built up from the first space.

7. The work machine of claim 6, further comprising a third space formed by the mounting plate, the rotating guard, the axle, and the final drive, the third space trapping an excess of material that has built up from the second space.

8. The work machine of claim 3, wherein the first plate comprises a plurality of holes such that the rotating guard is connectable to the final drive by a plurality of fasteners extending through the plurality of holes.

9. The work machine of claim 1, wherein the rotating guard is annular and formed from welded steel plate or steel castings.

10. The work machine of claim 2, wherein the slot has a thickness that is nominally larger than a thickness of the plate such that the rotating element and the rotating guard are rotatably separated and not physically connected.

11. The work machine of claim 3, further comprising a lip seal formed on a radially inner end of the first plate, and having a radially inward protruding seal element to mate with a corresponding surface in the final drive.

12. A method of operating a work machine comprising:

providing a work machine having a final drive rotatably supported on an outboard end of an axle, and a wheel mounted to an outboard end of the final drive, the wheel having a cylindrical shell extending axially and concentrically about the axle;

allowing a foreign material to enter an interior of a wheel drum;

restricting the foreign material to pass through a first gap between the axle and a rotating element connected to the wheel drum;

bounding the foreign material within a first space defined by the axle, the rotating element, and an internal guard fixed to the axle, wherein the rotating guard comprises a connecting portion and a plate extending from the connecting portion in a radially inward direction toward a portion of the internal guard, and wherein the internal guard extends from the axle in a radially outward direction toward the connecting portion;

restricting the foreign material to pass through a second gap between the rotating element and the internal guard, the second gap being accessible by the foreign material when a first volume of other foreign material has built up within the first space;

restricting the foreign material to pass through a third gap between the internal guard and a rotating guard;

bounding the foreign material within a second space defined by the internal guard and the rotating guard;

restricting the foreign material to pass through a fourth gap between the internal guard and the rotating guard, the third gap being accessible by the foreign material when a second volume of other foreign material has built up within the second space;

bounding the foreign material within a third space defined by the rotating guard, the internal guard, the axle, and the final drive;

restricting the foreign material to pass through a passage formed between the rotating element and the rotating guard, the passage being accessible by the foreign material as an alternate routing to the third gap;

restricting the foreign material to pass through a fifth gap between the rotating element and a rotating guard; and permitting the foreign material to access a seal area contacting an annular seal extending over the final drive, or an excess area separate from the seal area.

13. The method of claim 12, wherein a first plate of the rotating guard further comprises a plurality of holes such that the rotating guard is connectable to the final drive by a plurality of fasteners extending through the plurality of holes, and wherein the plate is a second plate of the rotating guard.

14. The method of claim 12, wherein the rotating guard is annular and formed from welded steel plate or steel castings.

15. The method of claim 12, wherein the rotating element and the rotating guard are rotatably separated and not physically connected.

16. The method of claim 12, further comprising a lip seal formed on a radially inner end of a first plate of the rotating guard, and having a radially inward protruding seal element to mate with a corresponding surface in the final drive.

* * * * *